Feb. 20, 1940.　　A. H. S. JENKINS ET AL　　2,191,429
WEAR COMPENSATING MECHANISM FOR BRAKES
Filed March 8, 1938　　2 Sheets-Sheet 1
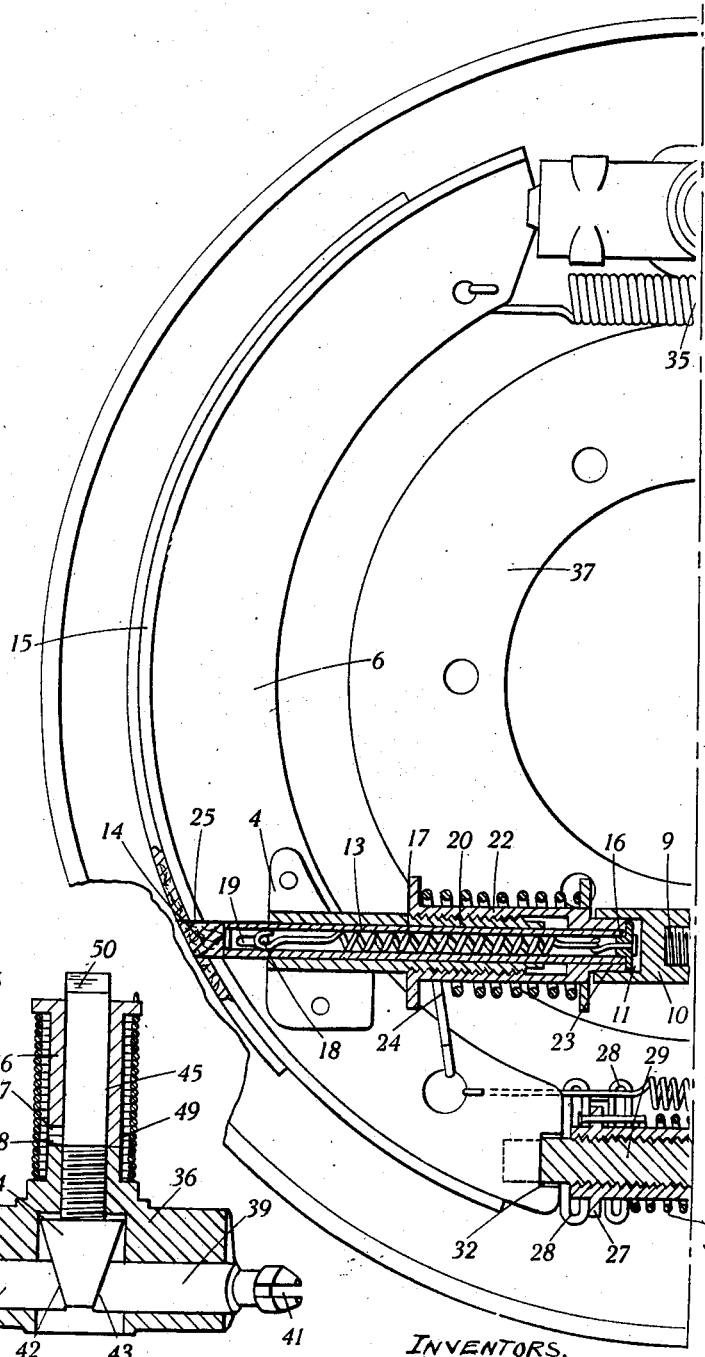
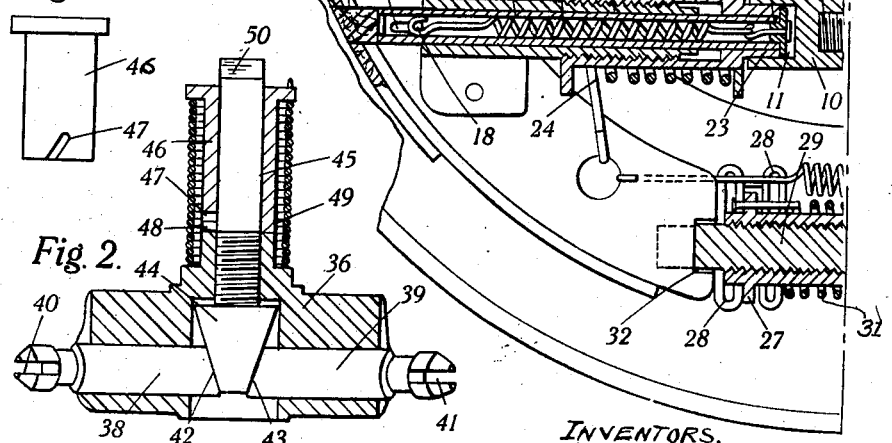
INVENTORS.
A.H.S. JENKINS.
W.C.J.D. REECE.
A.W. TUCK.
per　Norman S. Barlow.
attorney Feb. 20, 1940. A. H. S. JENKINS ET AL 2,191,429
WEAR COMPENSATING MECHANISM FOR BRAKES
Filed March 8, 1938  2 Sheets-Sheet 2

INVENTORS.
A. H. S. JENKINS.
W. C. J. D. REECE.
A. W. TUCK.
per Norman S. Barlow
Attorney Patented Feb. 20, 1940

2,191,429

UNITED STATES PATENT OFFICE 2,191,429

WEAR COMPENSATING MECHANISM FOR BRAKES

Andrew Herbird Sheldon Jenkins, Newport, and Wilfred Charles Jules Dubus Reece, Rumney, England, and Arthur William Tuck, Penarth, Wales Application March 8, 1938, Serial No. 194,580
In Great Britain March 16, 1937

8 Claims. (Cl. 188—79.5)

This invention comprises improvements connected with wear compensating mechanism for brakes of the kind wherein on the brake shoe lining wearing the brake is automatically adjusted to compensate for the wear of the lining.

The object of the present invention is to provide an improved and more efficient automatic wear compensating mechanism which is particularly adapted for use with automobile brakes, wherein each of the brake shoes is automatically adjusted independently of the other, so that in the event of the one shoe lining wearing more than the other the necessary adjustment is made.

A further object of this invention is to retain the initial shoe to drum clearance throughout the life of the brake linings, whilst the brake shoe centres are automatically readjusted in accordance with the wear of the brake linings.

Referring to the drawings.

Figures 1 and 1a are elevations partly in section of part of a brake fitted with a wear compensating device according to this invention.

Figure 2 is a modified arrangement for the automatic adjustment for the brake shoe centres, whilst, Figure 3 is an elevation of the sleeve for setting the torsion spring on said adjuster.

Figure 1A:
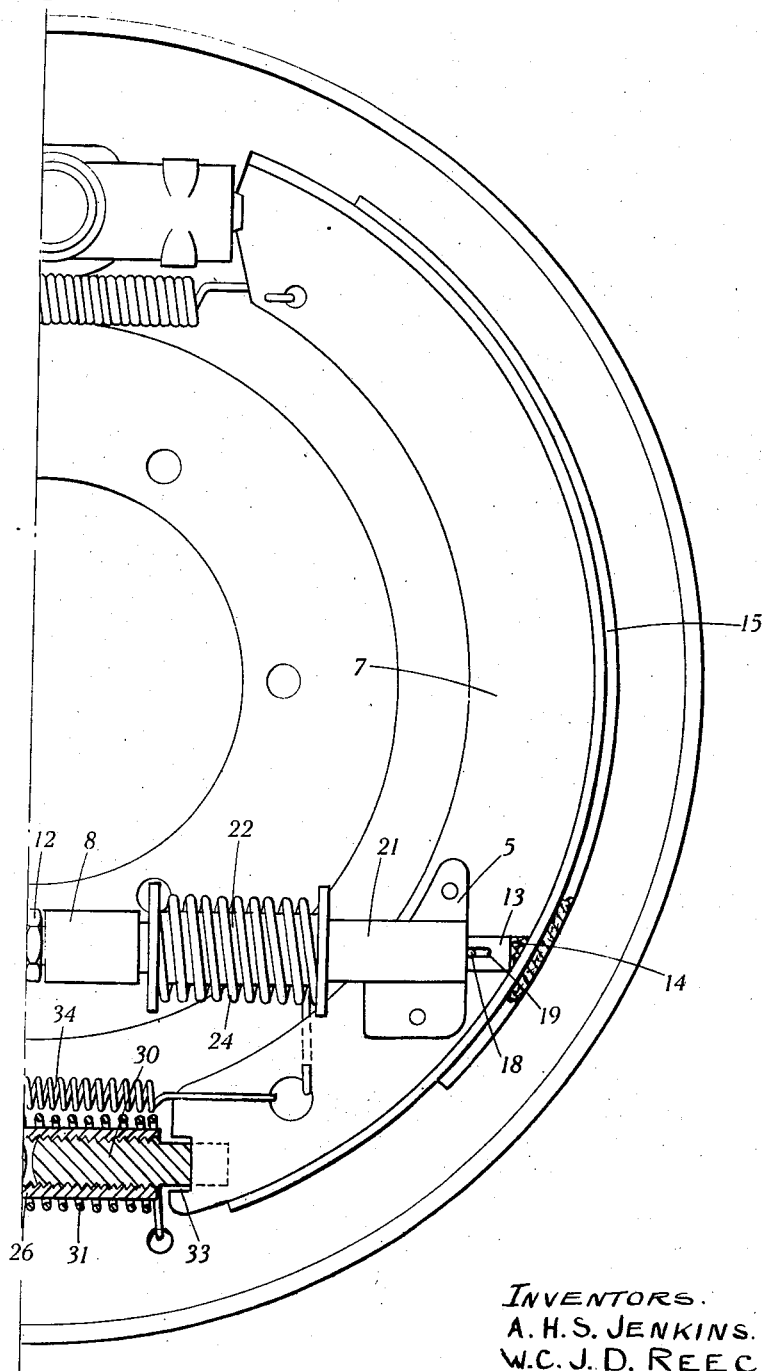

In carrying the present invention into practice as shown upon the accompanying drawings, brackets 4, 5 are mounted on the brake shoes 6, 7, said brackets being oppositely disposed to one another.

A distance piece is provided which is disposed substantially mid-way between each of the brake shoes 6, 7. Said distance piece is formed in two parts and consists of a cylindrical part 8 having a screwed spigot 9 formed on one end onto which is screwed the part 10 which has a recess 11 formed in the end of same, a similar recess being formed in the end of the first mentioned part 8. A lock nut 12 is mounted on the screwed spigot 9, so that the two cylindrical parts 8 and 10 can be extended or retracted and locked in the desired position by means of the lock nut 12.

Slidably mounted in each of the beforementioned brackets 4, 5 on the brake shoes 6, 7 is a tubular member 13, in the outer end of each of which is fitted a plug 14 of material which may be of a similar material to that of the brake lining 15, whilst closing the inner end of said tubular member 13 is a cap 16 to which is anchored the one end of a tension spring 17 said cap being held by a suitable stop against rotation. The other end of said tension springs 17 are anchored to a pin 18 which passes through slots 19 formed in said tubular members 13 and is held in position against the outer ends of the beforementioned brackets 4, 5 by means of the tension exerted by said springs 17.

The brackets 4, 5 mounted on the brake shoes 6, 7 have screwed extensions 20, 21 formed on their inner ends which are bored and through which the tubular members 13 pass.

Screwing onto said threaded extensions 20, 21 of the brackets 4, 5 are sleeves 22, the inner ends of which are formed with a reduced portion 23 which is rotatably mounted in the recess 11 formed in each end of the distance piece 8, 10.

Mounted around each sleeve 22 is a torsion spring 24, the one end of each of said torsion springs 24 is fastened to each of the shoes 6, 7, whilst the other end of each of said springs 24 is secured to the sleeve 22, so that when torsion is put on the springs 24 there is an urge for said sleeves 22 to be rotated along the screwed extensions, 20, 21 of the brackets 4, 5. The cap 16 which closes each of the tubular members 13 is adapted to engage the inner end of the screwed sleeves 22 so that the normal pressure exerted on the end of the screwed sleeves 22 by means of the tension springs 17, prevents the torsion exerted by the torsion springs 24 rotating the screwed sleeves 22.

The clearance allowed on the brake shoe linings 15. is set by the initial setting of the distance piece 8 in relation to the part 10 which fixes the overall length of the tubular members 13 with the plugs 14, the distance between the ends of the plugs 14 and the brake drum after the shoes 6, 7 are centralised is the clearance allowed to the brake shoes 6, 7. The caps 16 normally abut on the end of the recesses in the parts 8, 10.

The plugs 14 fitted into the ends of the tubular members 13 extend through apertures 25 formed in the brake shoes 6, 7 and linings 15 so that as wear takes place on the brake linings 15, the brackets 4 and 5 are moved along relatively to the tubular members 13, when the reduced portions 23 of the sleeves 22 are moved out of contace with the caps 16, thereby relieving the pressure exerted by the caps 16 under tension from the springs 13 and permitting the torsion springs 24 to rotate the screwed sleeves 22 until the reduced ends 23 of same again abut against the cap 16 when further rotation is prevented until further wear takes place on the linings 15 of the brake shoes 6, 7. When the shoes 6, 7 return to their off position they assume a position that is advanced towards the brake drum an amount equal to the wear on the brake shoe linings 15.

Positioned between the two ends of the brake shoes 6, 7 where said shoes pivot, is an arrangement for adjusting the brake shoe centres after each of the brake shoes has been repositioned to compensate for the wear of each of the linings 15 on said shoes. The adjuster consists of a tubular member 26 having a collar 27 which is located between spring positioning members 28 which are secured to the back plate. The interior of said tubular member 26 is screwed with a right and left hand thread in which is screwed the members 29, 30 which are similarly threaded to the interior of the tubular member 26, so that if said members are held against rotation and the tubular member 26 rotated, the two members 29, 30 can be caused to unscrew out of the tubular member 26.

Positioned around the tubular member 26 is a torsion spring 31, one end of which is connected to the tubular member 26, whilst the other end can be connected to a fixed point of the brake casing.

The ends of the brake shoes 6, 7 are pivotally mounted in the slots 32, 33 of the screwed members 29, 30 in the usual manner. It will therefore be seen that when the brake shoes 6, 7 return to their advanced released positions, as heretofore explained, pressure will be relieved on the screwed members 29, 30 which will permit of the rotation of the internally screwed member 26 under the action of the torsion spring 31 to extend the members 29, 30.

When torsion is applied to the torsion spring 31 there will be an urge for the member 26 to rotate and unscrew the members 29, 30 outwardly. This movement however is normally prevented by the pressure exerted on the members 29, 30 by the springs 34, 35 positioned across the shoes 6, 7 in the usual way.

When the brake is applied, the shoes 6 and 7 are forced against the brake drum in any well known manner, the plugs 14 will not receive any substantial pressure owing to the resilient mounting of the tubular members 13 in the brackets 4 and 5. When wear on either of the brake linings 15 on either of the brake shoes 6, 7 takes place, the brackets 4 or 5 will be moved along the tubular member 13 the amount of wear which has taken place on the brake lining 15 and in consequence the end of the reduced portion 23 of the screwed sleeves 22 will be moved out of contact with the caps 16, whereupon the screwed collars 22 will be rotated by the torsion springs 24, until the ends of the reduced portion 23 of the screwed collars 22 again abut against the caps 16 and prevent further rotation of the screwed collars 22 until further wear on the brake shoe linings takes place.

In a modified form of adjuster for the brake shoe centres as shown in Figures 2 and 3, a bracket 36 is provided which is secured to the back plate 37 of the brake, said bracket having two outwardly extending parts which are in alignment with the brake shoes 6, 7. Mounted in these outwardly extending parts of the bracket 36 are two slidable members 38, 39 the outer ends of which are provided with slots 40, 41 to receive the two ends of the brake shoes 6, 7 in which they pivot, the shoes 6, 7 being retained in contact with said slidable members 38, 39 by the usual springs 34, 35 which connects the two brake shoes 6, 7 together.

The inner ends of the slidable members 38, 39 are formed with inclined faces 42, 43 which engage a cone shaped member 44.

The cone shaped member 44 is provided with an extension 45 which is screw threaded and is screwed into the bracket 36 attached to the back plate 37 of the brake.

Mounted on the extension 45 of the cone shaped member 44 is a flanged sleeve 46 in which is provided a slot 47 which is adapted to engage a pin 48 positioned in the extension 45 of the cone shaped member 44. Around the sleeve 46 is positioned a torsion spring 49, the one end of which is adapted to be secured to the bracket 36, whilst the other end is secured to the sleeve 46.

When it is desired to set the shoes 6, 7 the cone shaped member 44 is rotated by means of a spanner or other suitable tool which engages the flats 50 formed on the end of the extension 45 to advance or retract the cone 44 to give the desired setting to the shoes 6, 7. The sleeve 46 and spring 49 are now placed over the extension 45, whilst the one end of the spring 49 is secured to the bracket 36 and the other end of the spring attached to the sleeve 46. The sleeve 46 is then rotated the required number of times to impart sufficient torsion to the spring 49 after which the sleeve 46 is pushed down so that the slot 47 engages the pin 48 on the extension 45.

When torsion is thus applied to the spring 49 there will be an urge for it to screw inwards and move the cone shaped member 44 along the inclined faces 42, 43 of the slidable members 38, 39 but this will normally be prevented by the pressure exerted on the cone shaped member 44 by the spring 34 connecting the brake shoes 6, 7 together.

It will be seen that when the brake shoes 6, 7 return to their advanced adjusted positions as heretofore explained to take up the lining wear, pressure will be relieved on the cone shaped member 44 which will permit of its rotation under the action of the torsion spring 49 and move outwardly the slidable members 38, 39 to adjust the brake shoe centres.

Instead of the member controlling the adjustment of the brake shoes being positioned to pass through the brake shoe and lining, it may be disposed on the side of the brake shoe, in which case the brake drum would be wider to allow for same.

It will be seen that each shoe is adjusted independently of the other, so that in the event of one shoe lining wearing faster than the other, the necessary adjustment will be made, furthermore the construction of each adjusted is the same, each being connected by a distance piece in the centre by which the necessary adjustment is made for setting the initial clearance for the brake shoe linings.

The brake shoes 6, 7 are operated by any well known means for forcing said shoes into contact with the brake drum.

What we claim is:

1. Wear compensating mechanism for brakes, comprising in combination a pair of brake shoes adapted to engage a brake drum, a slidably operable member which extends through each of the brake shoes and linings which are adapted to make contact with a brake drum, rotatable members to which torsion is applied which are normally held against rotation until the slidably operable members are depressed on lining wear taking place, when said rotatable members automatically rotate and advance the brake shoes towards the brake drum an amount equal to the wear of the brake lining and an expansible connector for adjustably connecting the brake shoe to compensate for the advancement of the brake shoes towards the brake drum.

2. Wear compensating mechanism for brakes, comprising in combination a pair of brake shoes adapted to engage a brake drum, a bracket mounted on each of said brake shoes, a slidably operable member mounted in each of said brackets, a screwed member rotatable under torsion disposed on each of said brackets and a spring controlled member for retaining said slidably operable members in their operable positions, so that on the slidably operable members being depressed on wear taking place on the brake shoe linings the rotatable members under torsion are automatically rotated to advance the brake shoes towards the brake drum in accordance with the wear on the brake shoe linings.

3. Wear compensating mechanism for brakes, comprising in combination a pair of brake shoes adapted to engage a brake drum, a tubular member mounted on each of said brake shoes the outer ends of which are screw threaded, a screwed sleeve mounted on each of said tubular members to which torsion is applied by a torsion spring, an adjustable distance piece positioned between said sleeves, a slidably operable member mounted in each of said tubular members which are adapted to extend through the brake shoes and brake linings and make contact with the brake drum, and spring controlled members which are adapted to make contact with the screwed sleeves to normally prevent rotation of same, so that when pressure is applied to the slidable members owing to wear on the brake lining, pressure is relieved on the screw threaded sleeves to permit of their automatic rotation under torsion to advance the brake shoes towards the brake drum in accordance with the amount of wear on the brake linings.

4. Wear compensating mechanism for brakes, comprising in combination a pair of brake shoes adapted to engage a brake drum, a tubular member mounted on each of said brake shoes the outer ends of which are screw threaded, a screw threaded sleeve mounted on each of said tubular members to which torsion is applied by a torsion spring, an adjustable distance piece positioned between said sleeves, a slidable operable member mounted in each of said tubular members which are adapted to extend through the brake shoes and brake linings and make contact with the brake drum, spring controlled members which are adapted to make contact with the screwed sleeves to normally prevent rotation of same, so that when pressure is applied to the slidable members owing to wear on the brake lining, pressure is relieved on the screw threaded sleeves to permit of their automatic rotation under torsion to advance the brake shoes towards the brake drum in accordance with the amount of wear on the brake linings and an expansible connector for adjustably connecting the two brake shoes to automatically compensate for the outward movement of the brake shoes in compensating for lining wear.

5. Wear compensating mechanism for brakes, comprising in combination a pair of brake shoes, a screw-threaded member mounted on each of the brake shoes, a slidably operable member mounted in each of the screw-threaded members on the brake shoes which is adapted to be depressed on wear taking place on the brake lining, a screw-threaded rotatable sleeve mounted on each of the screw-threaded members on the brake shoes to which torsion is applied, spring controlled means for normally preventing rotation of the screwed sleeves under torsion until the slidably operable members are depressed when wear takes place on the brake linings, when the screw-threaded sleeves automatically rotate and advance the brake shoes an amount equal to the wear of the brake linings, a distance piece on which the brake shoes fulcrum on the retraction of the brake shoes and an expansible articulating means under torsion for coupling the shoes together, so that the pivot points of the shoes are automatically adjusted an amount corresponding to the adjustment of the brake shoes for lining wear, to maintain the shoe pivots in their adjusted position.

6. Wear compensating mechanism for brakes, comprising in combination a pair of brake shoes, a pair of oppositely disposed slidably operable members mounted on said brake shoes which are adapted to make contact with a brake drum and a pair of rotatable members to which torsion is applied which are normally held against rotation until the oppositely disposed slidably operable members are depressed on lining wear taking place on either or both brake shoe linings when either or both of said rotatable members automatically rotate and advance the brake shoes towards a brake drum an amount equal to the wear of the brake shoe linings.

7. Wear compensating mechanism for brakes, comprising in combination a pair of brake shoes and brake linings, two oppositely disposed slidably operable members which are mounted one on each of the brake shoes and adapted to make contact with a brake drum, a pair of rotatable members to which torsion is applied which are normally held against rotation by the slidably operable members until either or both of said slidably operably operable members is depressed on lining wear taking place and an abutment against which each of said slidably operable members operate, so that when either or both of said slidably operable members is depressed on lining wear taking place on either or both of the linings of the brake shoes either or both of the brake shoes is advanced towards a brake drum an amount equal to the wear of the brake shoe lining.

8. Wear compensating mechanism for brakes, comprising in combination a pair of brake shoes, an abutment against which each of said brake shoes fulcrum when either or both of the brake shoes have been advanced in accordance with the lining wear, a rotatable cone-shaped member having a screw-threaded part connected to same which is screwed into a fixed part of the brake, a torsion spring connected to said cone-shaped member which is adapted to cause the rotation and advancement of said cone-shaped member outwardly of the fixed part of the brake, and slidable members which engage said cone-shaped member in which the pivot centres of the brake shoes are mounted, so that when the brake shoes are advanced in accordance with the lining wear, pressure on said cone-shaped member is relieved and said member is advanced under the action of the torsion spring to automatically effect the adjustment of the brake shoe pivot centres consequent on adjustment of the shoes for lining wear.

ANDREW HERBIRD SHELDON JENKINS.
WILFRED CHARLES JULES DUBUS REECE.
ARTHUR WILLIAM TUCK.